July 13, 1965  R. E. COLONIUS ETAL  3,194,121
POWER OPERATED WORKPIECE AND PATTERN HOLDING
FIXTURE FOR ROUTER MACHINES
Filed Nov. 15, 1963  5 Sheets-Sheet 1
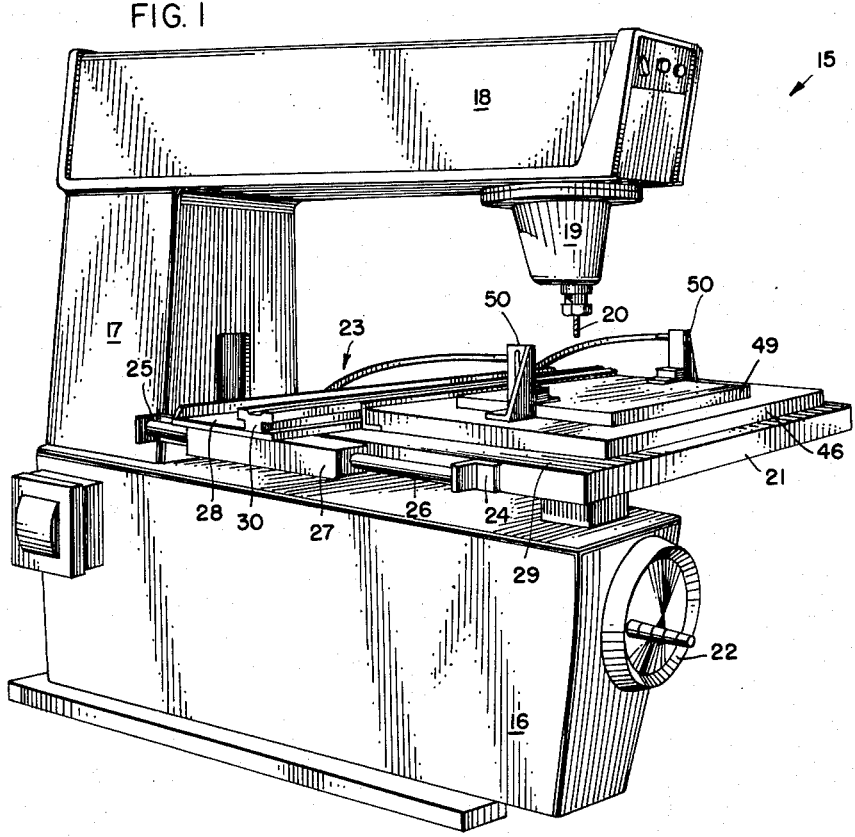
INVENTORS:
RAY E. COLONIUS
CHARLES R. ONSRUD
BY
ATT'YS

INVENTORS:
RAY E. COLONIUS
CHARLES R. ONSRUD

BY *Rummler & Snow*

ATT'YS

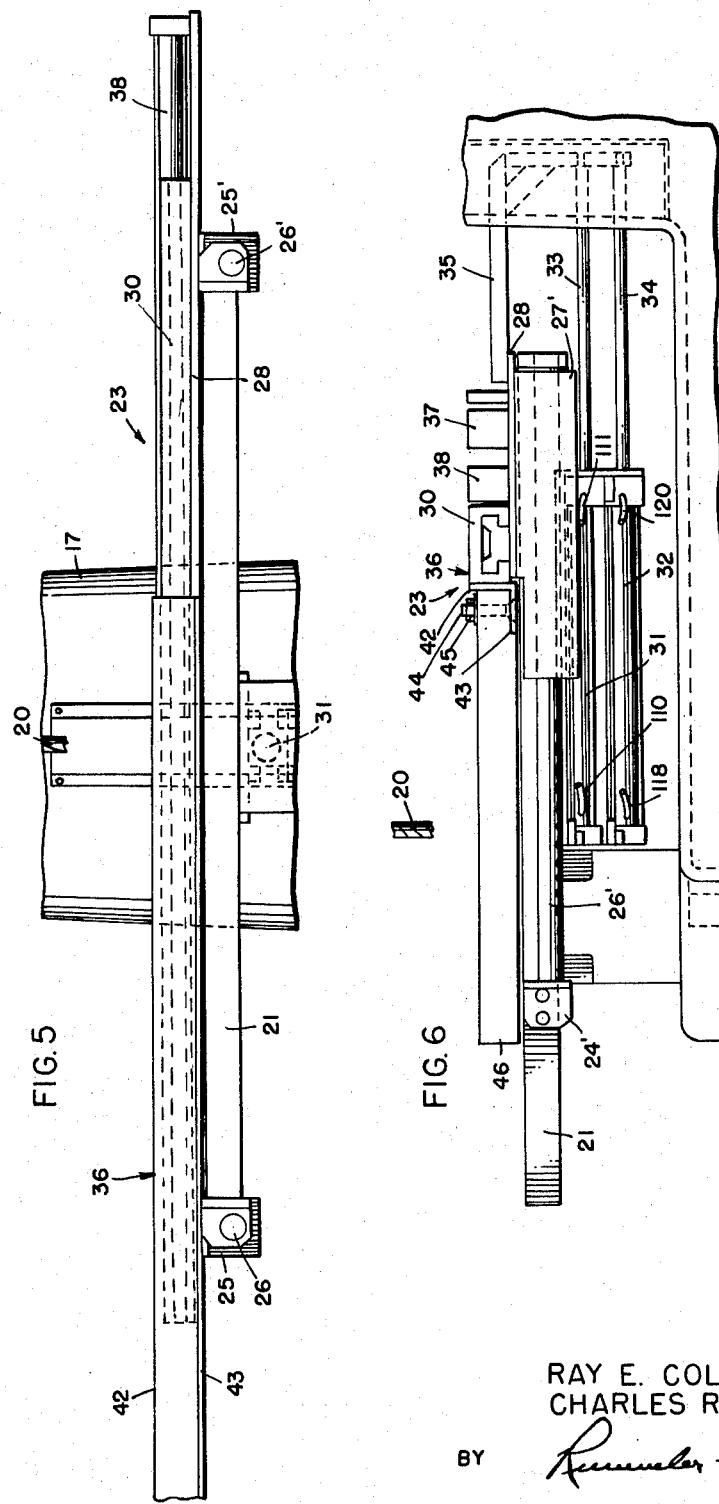

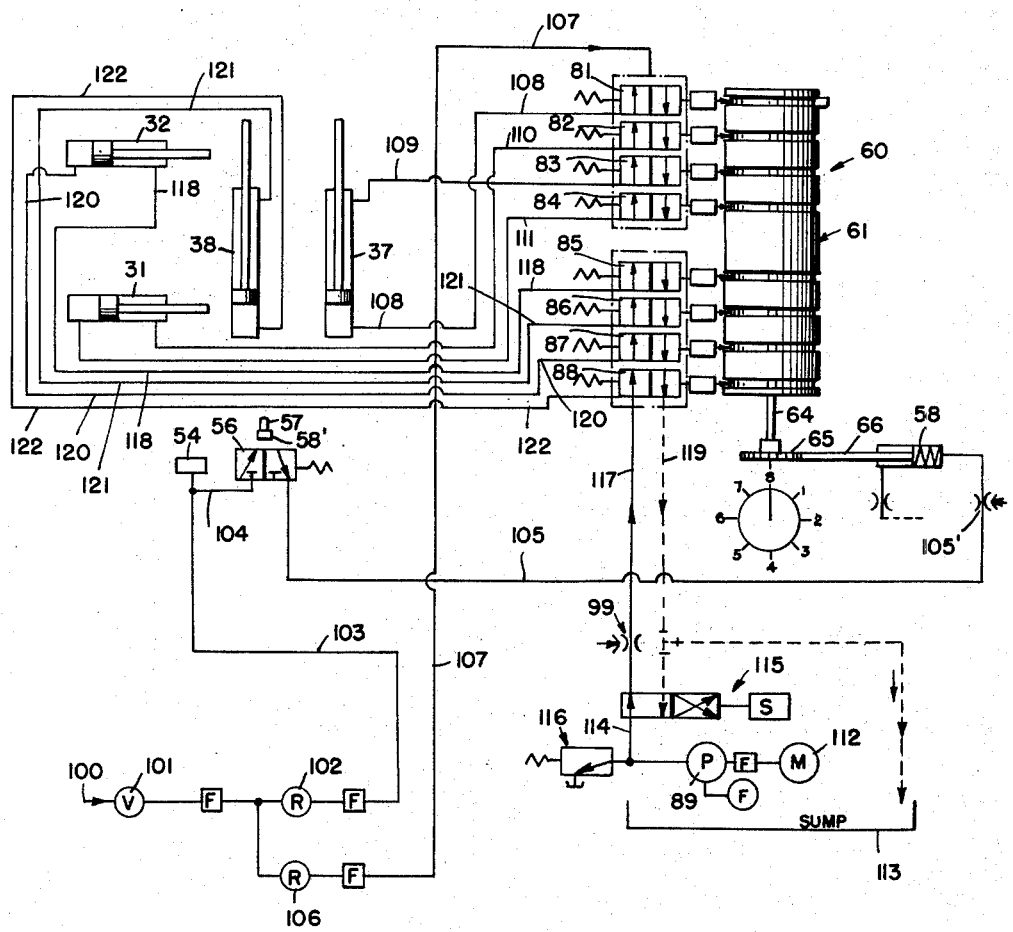

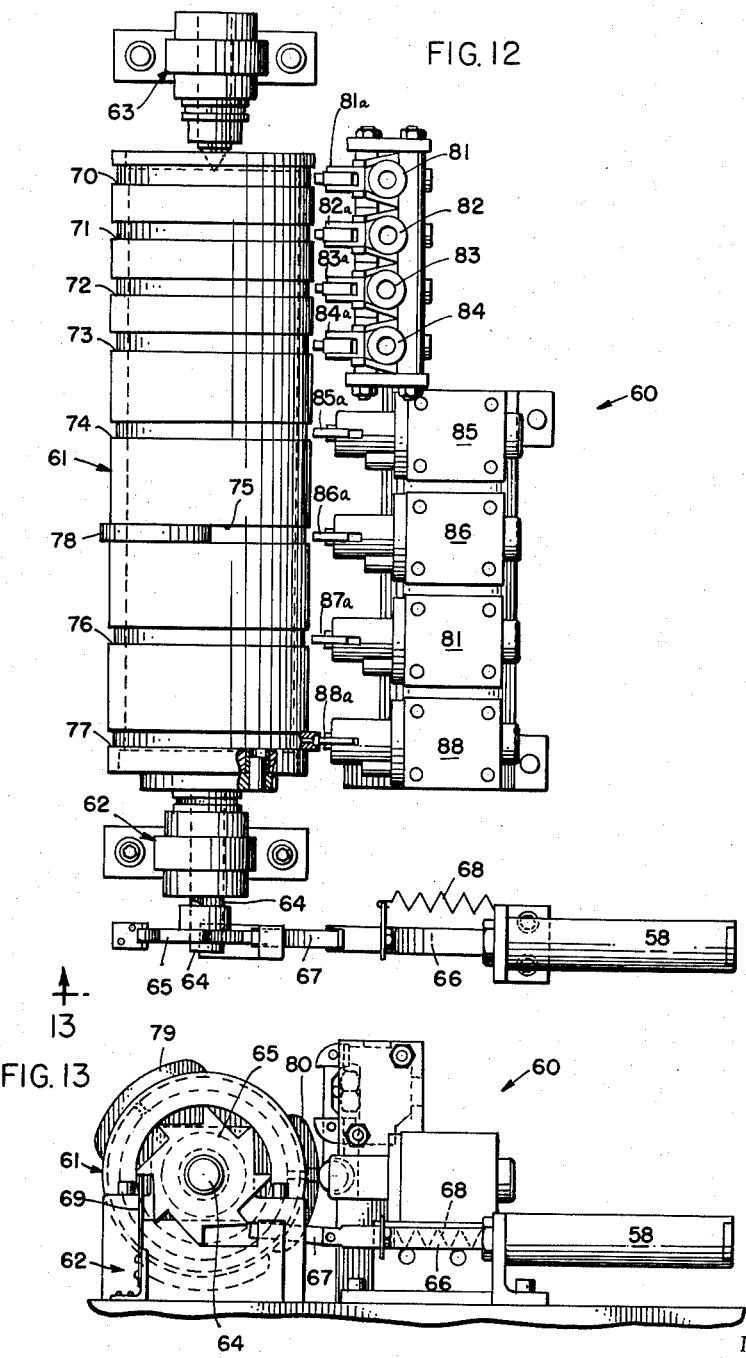

_United States Patent Office_ 3,194,121
Patented July 13, 1965

3,194,121
POWER OPERATED WORKPIECE AND PATTERN HOLDING FIXTURE FOR ROUTER MACHINES
Ray E. Colonius, Palatine, and Charles R. Onsrud, Chicago, Ill., assignors to Onsrud Machine Works, Inc., Niles, Ill., a corporation of Illinois
Filed Nov. 15, 1963, Ser. No. 324,054
12 Claims. (Cl. 90—13.2)

This invention relates to a fixture including a pattern for holding a workpiece particularly for use with routing machines. More in particular this invention relates to a power operated workpiece holding fixture or workholder adapted to move the workpiece in accordance with a predetermined scheduled program.

Heretofore known types of routing machines provide workpiece holding fixtures which require an operator to move manually the workpiece into the cutter along a prescribed path formed by a guide groove in a pattern indexed by a fixed pin on the stationary bed of the router. This not only requires constant attendance by an operator but also introduces uneven rates of cutting due to variations in force applied by the operator thus adversely affecting the quality of the product.

It is therefore a prime object of the present invention to provide a power operated fixture which moves the workpiece automatically at a predetermined maximum force and speed without influence of the operator.

A further object of the present invention is to provide a fixture in accordance with the preceding object wherein the fixture permits the moving of the workpiece horizontally in all directions pursuant to a predetermined path consistent with a predetermined scheduled program.

A still further object of the invention is to provide a workpiece holding fixture according to the preceding objects wherein the power means comprises hydraulic and pneumatic motors energized sequentially as prescribed by a programming device actuated by the pattern.

Another object of the present invention is to provide a workpiece holding fixture according to the preceding objects wherein the time requirements of an operator is reduced whereby the operator may operate simultaneously a plurality of routing machines equipped with the present invention.

These and other obvious and inherent objects of the invention will be more readily understood from the ensuing description of a specific embodiment of the invention, the appended claims and the annexed drawings wherein:

FIGURE 1 is a perspective view of a routing machine having the fixture of the present invention;

FIG. 2 is a bottom-side view of a pattern showing the guide groove for the pattern's horizontal movement in relation to a fixed pin, the cross marks in the guide groove indicating the approximate location of the trip dogs or control actuating cams in accordance with the invention.

FIG. 3 is a view showing the bottom side of a pattern as in FIG. 2 but having a different configuration of the guide groove;

FIG. 5 is a front view, partly broken away, taken on line 5—5 of FIG. 4, showing additional details of the fixture of this invention;

FIG. 6 is a side view, partly broken away, taken on line 6—6 of FIG. 4, showing additional details of the fixture of this invention;

FIG. 11 is a schematic drawing showing the hydraulic and pneumatic circuits for energizing the motors for moving the workpiece by the fixture of this invention;

FIG. 12 is a plan view of the program mechanism for sequentially energizing the hydraulic and pneumatic motors in the fixture for moving the workpiece in accordance with a prescribed schedule; and FIG. 13 is an end view, partly broken away, taken on line 13—13 of FIG. 12, showing further details of the program mechanism of FIG. 12.

Figure 4:
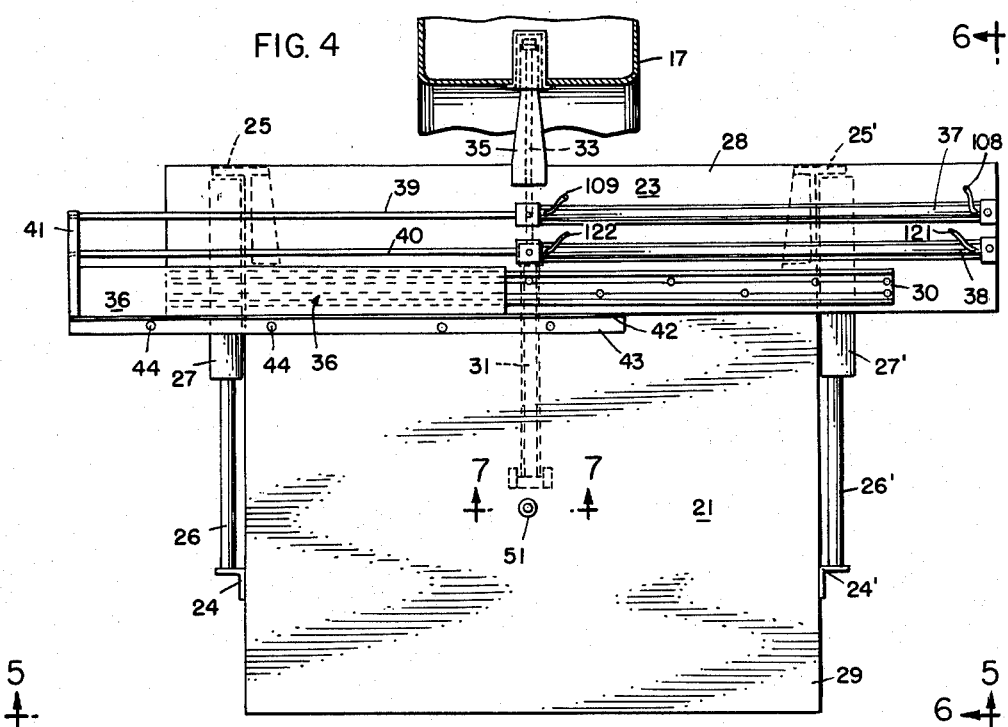
FIG. 4 is a plan view, partly in section and partly broken away, of the routing machine bed of FIG. 1 but excluding the pattern and workpiece as well as the cutting head.

Referring now to the drawings the numeral 15 indicates generally a router machine of the type sometimes referred to in the trade as a "pin router." The router 15 comprises a stationary frame 16, integrally connected to a column 17 which in turn supports a cross head or arm 18 as it is conventionally known. The cross head 18 supports a conventional cutting head 19 and its associated power-rotated cutter element 20. Mounted on the frame 16 is a conventional bed plate 21 which may be elevated by a jack (not shown) operated by the handwheel 22.

The fixture of this invention, indicated generally by the numeral 23, is supported by the bed plate 21. The fixture 23 is supported from the bed plate 21 by two pairs of brackets one pair being shown at 24 and 25 on one side and a similar pair of brackets 24' and 25' disposed on the opposite side as may be apparent from FIGS. 1 and 4. The brackets 24 and 25 support a horizontal rod 26 upon which is mounted a slidable block 27. Thus the block 27 is movable forwardly and rearwardly with respect to the bed plate 21. It will be appreciated that the rightward side of the bed plate 21 is provided with an assembly similar to the brackets 24, 25, rod 26 and block 27 designated 24', 25', 26' and 27' in FIG. 4.

Secured to the slidable blocks 27 and 27' in horizontal relation is a flat carrier plate 28 which is thus movable forwardly and rearwardly across the upper surface 29 of the bed plate 21.

Connected to the carrier plate 28 in rigidly fixed relation is a longitudinally extending guide bar or slideway 30 as seen best in FIGS. 4 and 6. Thus the slideway 30 also moves forwardly and rearwardly with blocks 27 and 27' and the carirer plate 28. Means for moving the horizontal carrier plate 28 and blocks 27 and 27' forwardly and rearwardly under power will now be described.

Secured to the underside of the bed plate 21 is a pair of reversible or two-way acting fluid rams or motors disposed one above the other, in parallel relation as indicated at 31 and 32 in FIG. 6. One of these rams 31, 32 is energized hydraulically and the other pneumatically for reasons which will be explained later herein. The ram 31 is provided with a conventional piston rod or work member 33 and the ram 32 is provided with work member 34 in a conventional manner.

Secured in rigid relation to the outer ends of the work members 33 and 34 is a right-angle bracket, indicated at 35 in FIGS. 4 and 6, and, in turn, the angle-bracket 35 is secured to the horizontal carrier plate 28. Thus it will be apparent that if either of the rams 31 or 32 is energized expansively the carrier plate 28 will be urged rearwardly and when energized retractively the guide rail will be urged forwardly on the work table or bed plate 21 of the router machine.

As seen in FIGURE 6 the guide rail 30 is fitted with a slidable block 36 which is movable leftwardly and rightwardly with reference to the bed plate 21 of the router 15. From FIG. 6 it will be noted that the cross-sectional contour of the guide rail 30 and slidable block 36 is such that the block 36 is movable only along the rail 30 and is simultaneously held firmly against lateral tilt or twist. Means for moving the slidable block 36 rightwardly and leftwardly under power will now be described.

Secured in rigid relation to the upper side of the horizontal carrier plate 28 is another pair of reversible rams or motors 37, 38 as best seen in FIG. 4. One of the rams 37, 38 is energized hydraulically and the other pneumatically for reasons explained later herein. The ram 37 is provided with a piston rod or work member 39 and likewise the ram 38 is provided with work member 40. The outer ends of the two work members 39 and 40 are rigidly secured to the slidable block 36 by bracket 41 as best seen in FIG. 4. Thus it is apparent when ram 37 or 38 is energized expansively the slidable block 36 is urged leftwardly as viewed in FIG. 4 and when either of the rams 37, 38 is energized retractively the block 36 is urged rightwardly.

Secured to the forward side of the slidable block 36, is an angle bar 42 having a horizontally projecting flange 43 disposed in closely spaced relation with the top surface 29 of the work table 21, as best seen in FIGS. 1 and 5. The flange 43 of the angle bar 42 is provided with two or more upstanding studs 44, appropriately spaced along the length of the angle bar, which studs are threaded at their upper end portions to receive nuts 45. The purpose of the angle bar 42 and the studs 44 is to mount a pattern 46 or 46′, examples of which are shown in FIGS. 2 and 3. The pattern 46 is provided with appropriately located holes, along its rearward edge, for receiving the studs 44 and is secured to the bar 42 by means of the nuts 45. Also the rearward bottom margin of the pattern 46 is rabbeted, as at 47, to receive the flange 43 so that the bottom surface of the pattern will rest substantially flat on the top surface 29 of the work table 21.

The pattern 46 is conventionally provided with a groove 48 having a prescribed contour which serves to guide the workpiece 49 into the cutter element 20 of the router 15 in a conventionally known manner. The pattern 46 is mounted on the angle bar 42 with the guide groove 48 facing downward as may be apparent from FIGS. 1, 7 and 8. Also, as seen in FIG. 1, the upper side of the pattern 46 is provided with a pair of opposed pneumatically operated work clamps 50 which serve as releasable work holders for securing the workpiece 49 in proper position on the pattern, suitable indexing means, not shown, being provided in the conventional manner.

Figure 7:
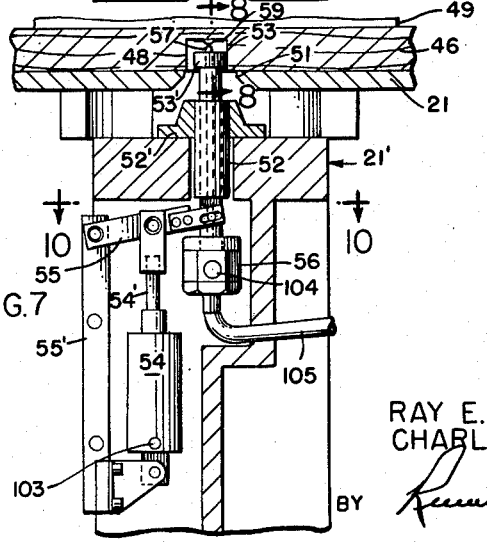
FIG. 7 is a vertical sectional view, partly broken away, taken on line 7—7 of FIG. 4, illustrating details of the actuating mechanism of the stationary guide pin.

Referring now to FIGS. 4 and 7 it will be seen that the bed plate 21 is provided with an aperture 51 located at the center thereof. Mounted on the substructure 21′ of the bed plate 21 (FIG. 7), directly below the aperture 51, is a bushing 52 mounted in a flanged holder 52′, and slidably disposed within the bushing 52 is a vertical guide pin 53 which is adapted to be projected above the surface 29 of the bed plate 21. The upper end of the pin 53 is provided with a roller 53′ for reception into the guide groove 48 of the pattern 46. Thus it is apparent that when the pattern 46 is secured to the slide bar 36 and the carrier plate 28 and the guide pin roller 53′ is engaged in the pattern groove 48, the normal horizontal movement of the pattern 46 in all directions will be determined by the contour of the groove 48 as shown, for example, in FIG. 3.

The guide pin 53 and its associated roller 53′ may be retracted below the surface 29 of the bed plate 21 by means of a fluid ram 54 secured to the substructure 21′ as shown in FIG. 7. The ram work member 54′ is pivotally connected to an arm 55 which in turn is pivotally connected to the substructure 21′ by a bracket 55′. The other end of the arm 55 is pivotally connected to the lower end portion of the guide pin 53. During normal operation the ram 54 is energized which elevates the guide pin 53 and its associated roller into the guide groove 48 of the pattern 46. The ram 54 is retracted to withdraw the guide pin during operations for removing one pattern 46 and installing a different pattern, e.g. 46′.

Figure 10:
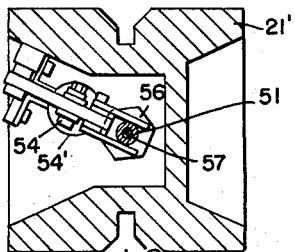
FIG. 10 is a sectional view, taken on line 10—10 of FIG. 7, illustrating further details of the sensing means and guide pin operating means.

Secured to the bottom end of guide pin 53 is a pneumatic valve 56 having a vertically extending actuator rod 57 terminating above the roller 53′. When the rod 57 is depressed the valve 56 is opened and a source of compressed air is thereby communicated to the ratchet-operating spring-loaded one-way ram or cylinder 58 of a program control device (FIG. 10). The valve 56 is spring loaded to a normally closed position holding the actuator rod in raised position projecting above the guide pin roller 53′, and the assembly of guide pin and valve moves as a unit when actuated by the ram 54 to raise and lower the guide pin.

Figure 8:
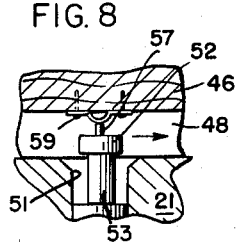
FIG. 8 is a vertical sectional view, partly broken away, taken on line 8—8 of FIG. 7, illustrating the actuation of the sensing means of the fixed pin by an actuating cam positioned in the guide groove of the pattern.
Figure 9:
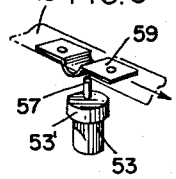
FIG. 9 is a perspective view of an actuating cam of the pattern groove in position for actuating the sensing means of the fixed pin.

Now in order to actuate the rod 57 and its associated valve 56 the upper inner surface of the guide groove 48 of the pattern 46 is provided with a plurality of cam elements 59 as best shown in FIGS. 7, 8 and 9. The cam elements 59 may be secured within the groove 48 by any conventional means. Thus the valve 56, actuating rod 57 and cam elements 59 combinedly comprises a sensing means and as the pattern 46 is moved over the bed plate 21 in a path prescribed by the guide groove 48 the actuator rod 57 encounters the cam elements 59 successively and at each encounter the ratchet-operating ram 58 of FIG. 10 is momentarily energized and then retracted when the cam element 59 has been passed. The purpose of actuation of the ratchet-operating ram will now be described.

Referring now to FIGS. 12 and 13 there is shown a program mechanism generally indicated at 60. In the embodiment illustrated the program mechanism 60 comprises a rotatable cylinder or drum 61 rotatably supported by bearings 62 and 63. One end of the drum 61 is provided with a shaft 64 extending through the bearing 62 and secured to the shaft 64 at its outer end is a ratchet wheel 65 having, in this case, eight teeth. The ram 58 is mounted in alignment with the ratchet wheel 65 and the work member 66 of the ram 58 is provided with a pivoted lever 67 (FIG. 13) so that when the ram 58 is energized expansively for a momentary period the lever 67 engages one tooth of the wheel 65 to rotate the wheel 65 through one angular displacement increment represented by the one tooth (in this case 45°). Retraction of the ram 58, when de-energized, through action of tension spring 68 moves the lever 67 into position for engaging the next tooth of the ratchet wheel 65. Reverse rotation of the ratchet wheel 65 is prevented by spring 69 which engages the radial face of one tooth. Thus the ratchet wheel 65 may rotate only in the clockwise direction as viewed in FIG. 13. In the embodiment shown when the ram 58 is intermittently energized eight times the drum will have made one complete revolution in the clockwise direction.

The drum 61 is provided, in this embodiment, with eight annular grooves 70–77. Secured in each of the grooves 70–77 is an angularly adjustable cam member, three of which are shown at 78, 79 and 80.

Mounted in stationary relation in alignment with grooves 70–73 are, respectively, pneumatic valves 81–84. The valves 81–84 are provided with respective actuators 81a, 82a, 83a and 84a, as shown in FIG. 12. In a similar manner, mounted in alignment with grooves 74–77 are, respectively, hydraulic valves 85–88 which are also provided with actuators 85a, 86a, 87a and 88a respectively as shown.

From the above it will be appreciated that the cam members secured in each of the annular grooves 70–77 may be of such number and may be positioned so that each of the valves will be actuated sequentially in any desired programmed order as the ram 58, through ratchet wheel 65, turns the drum 61 intermittently through predetermined increments of angular movement, and that FIGS. 12 and 13 represent but one operative embodiment of a suitable control device.

Referring now to FIG. 11 the numeral 100 indicates a source of compressed air connected to the inlet side of a shut-off valve 101. From the valve 101 the compressed air source communicates with the inlet side of pressure regulator 102 and thence to the one-way acting spring-loaded fluid ram 54 and the inlet side of the two way pneumatic valve 56, through conduits 103 and 104, as shown. The outlet side of pneumatic valve 56 is connected to the air cylinder 58 of the program mechanism 60 through conduit 105 and adjustable speed control valve 105′. The source of compressed air 100 also communicates with the inlet side of each of the pneumatic valves 81–84 through pressure regulator 106 and conduit 107. The outlet side of valve 81 communicates with one end of air cylinder or ram 37 through conduit 108. The other end of air cylinder 37 communicates with the outlet side of valve 83 through conduit 109. Air valve 82 communicates with one side of air cylinder 31 through conduit 110 while the other end of air cylinder 31 is connected to air valve 84 through conduit 111. At this point it should be understood that the valves 81–84 function to energize respectively one end of the cylinders 31 and 37 while exhausting the other end.

The source of hydraulic pressure is the pump 89, driven by motor 112, which draws hydraulic fluid from the sump 113 and delivers fluid under pressure to the adjustable restriction valve 99 through conduit 114. Interposed in conduit 114 is a solenoid operated shut-off control valve generally indicated at 115 and pressure limiting relief valve 116. The purpose of the restriction valve 99 is to control adjustably the rate of flow of hydraulic fluid to the inlet sides of hydraulic valves 85–88 through conduit 117 which in turn regulates the rate of movement of hydraulic rams 32 and 38. The valve 85 when actuated connects the conduit 117 with one side of the hydraulic ram 32 through conduit 118 while the other side of the ram 32 communicates with drain line 119 through conduit 121 and hydraulic valve 87. In the alternative when valve 87 is actuated the ram 32 is energized in the opposite direction and valve 85 connects conduit 118 with drain line 119 for exhausing fluid from the opposite end of the ram 32 to sump 113. When de-actuated the valves 85–88 communicate respectively the rams 32 and 38 with drain line 119. Hydraulic valve 86 is connected to one end of ram 38 through conduit 121 and the other end of ram 38 is connected to hydraulic valve 88 through conduit 122. As will be apparent later herein only one of the rams 32, 38 is energized in one direction during a given period governed by the program mechanism 60 and the other hydraulic ram is in exhaust condition and thus freely movable by an external force on its work member. Likewise the program mechanism 60 only energizes one of the pneumatic cylinders 31, 37 during a given period while the other pneumatic ram is in exhaust condition and thus freely movable by any external force on its work member.

Having now described the construction of a preferred embodiment of our invention the operation thereof will now be described.

*Operation*

One of the objectives of the present invention is to keep the roller 53′ of the sensing means in continuous contact with only one side of the guide groove 48 of the pattern 46. Now suppose for example that routing of the workpiece 49 commences at point 48a of guide groove 48 of pattern 46′ as shown in FIG. 3 and the pattern 46′ is to move in the direction shown by the arrow in FIG. 3. Now in order to move the pattern 46′ and workpiece 49 in the direction (leftward with respect to bed plate 21) the ram 38 is hydraulically energized (FIG. 4). Thus the energization of hydraulic ram 38 expansively (e.g. 40 p.s.i.) moves the pattern 46 and workpiece in the leftward direction, as viewed in FIG. 4, at a positive rate of movement fixed by the pump 89 (FIG. 11) and the adjustable restriction valve 99. At the same time the pneumatic ram 31 is energized retractively, which urges, yieldably, the pattern 46 forwardly. In effect this causes the outer wall of the guide groove 48 to bear against the roller 53′ of the indexing or guide pin 53. Since the ram 31 is pneumatically pressurized at low pressure (e.g. 20 p.s.i.) the pattern 46 may follow its prescribed curved path over the pin 53 as the compressed air in ram 31 is yieldable in a rearward movement. During this period of operation the rams 32 and 37 are deenergized and the chambers thereof are in exhaust condition and thus offer no resistance to pattern movement. The movement just described is the result of the first position or stage on the program mechanism 60.

When the pattern 46 has been moved leftwardly until the indexing pin 53 reaches point 48b of the groove 48 (FIG. 3) the actuator rod 57 of the sensing means momentarily engages a first cam element 59 which now actuates the pneumatic valve 56. Momentary actuation of the valve 56 energizes the cylinder 58 which rotates the drum 61 an increment of 45° to the second position of the program mechanism 60. Hydraulic valves 86 and 88 are actuated to energize hydraulic ram 32 retractively and likewise valves 81 and 83 are actuated to energize pneumatic ram 37 retractively. The pattern 46 is now moved in the forward direction while the pneumatic ram 37 urges yieldably the pattern 46 leftwardly. During this second stage of operation rams 31 and 38 are in exhaust condition.

When the pattern 46 has been moved forwardly under force of hydraulic ram 32 such that the indexing pin 53 has reached point 48c of guide groove 48 of the pattern 46 (FIG. 3) the rod 57 of the sensing means engages the second cam element 59 which again actuates ram 58 of the program mechanism 60 to the third stage. In this third stage the hydraulic valves 87 and 88 actuate hydraulic ram 38 in reverse direction (retractively) from that of the first stage. Likewise valves 81 and 83 actuate pneumatic ram 31 expansively. Thus the pattern 46 and workpiece 47 move rightwardly under force of the hydraulic ram 38 and the pattern 46 is yieldably urged rearwardly. During the third stage operation the rams 31 and 37 are in exhaust condition.

When the pattern 46 has moved along the prescribed groove until the indexing pin 53 reaches point 48d the actuator rod 57 of the sensing means again encounters a third cam element 59 which again momentarily energizes the ram 58 of the program mechanism 60 to the fourth stage. Valves 85 and 87 energize hydraulic ram 32 to drive the pattern 46 rearwardly and valves 81 and 83 energize pneumatic ram 37 to urge the pattern 46 in a leftward direction.

When the pattern has been moved rearwardly under force of hydraulic ram 32 until the indexing pin 53 of the sensing means encounters the fourth cam element 59 at point 48e (FIG. 3) which again actuates the ram 58 of the program mechanism 60 back, in this case, to the first stage above described whereby the point 48a is again reached thereby completing the cycle.

From the foregoing it will become apparent that when hydraulic ram 32 is energized the pneumatic ram 37 will also be energized while rams 31 and 38 are in exhaust condition. Also when hydraulic ram 38 is energized the pneumatic ram 31 will be energized while at the same time rams 32 and 37 will be in exhaust condition. It will also be apparent that the hydraulic rams function to move the pattern 46 and workpiece 49 horizontally at a speed rate controlled by the restriction valve 99. The low air pressure (e.g. 20 p.s.i.) energizing of the rams 31, 37 provide a resilient urging of the pattern 46 and workpiece 49 horizontally in a direction 90° from the path of travel at the urging of one of the rams 32 or 33. This pneumatic resiliency permits lateral movement of the pattern 46 and workpiece 49 as may be required by the curvature of the guide groove 48 in the pattern 46. The sensing means including cam elements 59 serves to actuate the program mechanism 60 for shifting the path of movement by changing, correspondingly, the energization of rams 31, 32, 37 and 38. It will thus be apparent that the cam members (e.g. 78) of the program mechanism must be set in accordance with the directional characteristics of the guide groove 48 of the pattern 46. From this it can be seen that the program mechanism 60 can be set for any configuration of the pattern groove 48. While the program mechanism 69 as shown provides for eight stages of operation it should be appreciated that a device having more or less stages may be used depending upon the number of direction of movement shifts required by the configuration of the guide groove 48 in the pattern 46.

From the foregoing it will be appreciated that the operator is only required to insert a workpiece 49 in the conventional pneumatic clamps 50 (FIG. 1) and close the solenoid valve 115. Thereafter the pattern 46 will move the workpiece 49 throughout the course prescribed by the groove 48 in pattern 46 while engageing cutter 20. When the groove 48 has been traversed entirely over the indexing pin 53 the operator opens solenoid valve 115 and removes the finished workpiece 49. Thus the fixture 23 requires no attention from the operator during the time required by the router 15 to perform the work of cutting on the workpiece 49 which leaves the operator free to perform other functions not related to the router 15.

Having thus described a preferred embodiment of the invention it can now be seen that the objects of the invention have been fully achieved and it must be understood that changes and modifications may be made which do not depart from the spirit of the invention nor from the scope thereof as defined in the appended claims.

We claim:

1. In combination with a router machine having a cutter element, a fixture having a program mechanism for horizontally moving a workpiece under power along a path prescribed by a guide means in a pattern, said fixture comprising:
   (a) first and second reversible power units positioned to urge said workpiece in linear directions normal to each other,
   (b) a multi-stage program mechanism positioned to energize alternately each of said power units in predetermined sequential order,
   (c) and a sensing means cooperative with said guide means and connected to actuate said program mechanism at predetermined positions,
whereby said workpiece is moved under power relative to said cutter element in accordance with said path prescribed by said guide means in said pattern.

2. The combination according to claim 1 wherein resilient means are positioned to urge horizontally said workpiece in a direction normal to the direction urged by each of said power units.

3. The combination set forth in claim 1 wherein the power units comprise reversible hydraulic rams.

4. The combination set forth in claim 1 wherein the sensing means for actuating said program mechanism includes a fluid valve having an actuator rod engageable with a plurality of sensing elements disposed in the guide means of said pattern in horizontal spaced relation.

5. The combination according to claim 2 wherein said resilient means comprises pneumatically operated rams energized in sequential order at low pressure under control of said program mechanism.

6. The combination set forth in claim 4 wherein the guide means comprises a groove of a predetermined configuration and said sensing elements comprises fixed cam elements.

7. A machine fixture programmed for moving a workpiece under power along a path prescribed by a guide means in a pattern comprising:
   (a) a first support means horizontally movable in a first linear direction,
   (b) a second support means carried by said first support means horizontally movable with respect to said first support means in a second linear direction normal to said first linear direction,
   (c) a first reversible power unit positioned to urge said first support means in said first linear direction,
   (d) a second reversible power unit positioned to urge said second support means in said second linear direction,
   (e) a multi-stage program mechanism connected to energize each of said power units alternately in predetermined sequential order,
   (f) and a sensing means positioned to actuate said program mechanism progressively at predetermined positions in said guide means,
whereby said workpiece is moved under power in accordance with said path prescribed by said guide means in said pattern.

8. The machine fixture according to claim 7 wherein resilient means are positioned to urge horizontally said workpiece in a direction normal to the horizontal direction urged by each of said power units.

9. The machine fixture according to claim 8 wherein said resilient means comprises pneumatically operated rams energized in sequential order at low pressure under control of said program mechanism.

10. The machine fixture set forth in claim 7 wherein the power units comprise reversible hydraulic rams.

11. The machine fixture set forth in claim 7 wherein the sensing means for actuating said program mechanism includes a fluid valve having an actuator rod engageable with a plurality of sensing elements disposed in said guide means of said pattern in horizontal spaced relation.

12. The machine fixture according to claim 11 wherein the guide means comprises a groove of a predetermined configuration in the pattern and said sensing elements are cam elements disposed in the bottom of said groove.

No references cited.

WILLIAM W. DYER, Jr., *Primary Examiner.*